US008463801B2

(12) United States Patent
Liu et al.

(10) Patent No.: US 8,463,801 B2
(45) Date of Patent: Jun. 11, 2013

(54) EFFECTIVELY AND EFFICIENTLY SUPPORTING XML SEQUENCE TYPE AND XQUERY SEQUENCE NATIVELY IN A SQL SYSTEM

(75) Inventors: Zhen Hua Liu, San Mateo, CA (US); Muralidhar Krishnaprasad, Fremont, CA (US); James W. Warner, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 2079 days.

(21) Appl. No.: 11/098,887

(22) Filed: Apr. 4, 2005

(65) Prior Publication Data

US 2006/0224576 A1  Oct. 5, 2006

(51) Int. Cl.
*G06F 7/00* (2006.01)

(52) U.S. Cl.
USPC .......................................... 707/756; 707/759

(58) Field of Classification Search
USPC ....................................................... 707/4, 756
See application file for complete search history.

(56) References Cited

U.S. PATENT DOCUMENTS

| | | | |
|---|---|---|---|
| 5,999,941 A | 12/1999 | Anderson | |
| 6,012,067 A | 1/2000 | Sarkar | |
| 6,253,195 B1 | 6/2001 | Hudis et al. | |
| 6,282,537 B1 | 8/2001 | Madnick et al. | |
| 6,510,434 B1 | 1/2003 | Anderson et al. | |
| 6,574,655 B1 | 6/2003 | Libert et al. | |
| 6,684,204 B1 | 1/2004 | Lal | |
| 6,772,413 B2 | 8/2004 | Kuznetsov | |
| 6,918,082 B1 | 7/2005 | Gross et al. | |
| 7,031,956 B1 | 4/2006 | Lee et al. | |
| 7,043,716 B2 | 5/2006 | Zimmer et al. | |
| 2001/0037345 A1 | 11/2001 | Kiernan et al. | |
| 2002/0035606 A1 | 3/2002 | Kenton | |
| 2002/0073019 A1 | 6/2002 | Deaton | |
| 2002/0087510 A1 | 7/2002 | Weinberg et al. | |
| 2002/0100027 A1 | 7/2002 | Binding et al. | |
| 2002/0116457 A1 | 8/2002 | Eshleman et al. | |
| 2003/0033285 A1 | 2/2003 | Jalali et al. | |
| 2003/0154204 A1 | 8/2003 | Chen-Wright et al. | |
| 2004/0015783 A1 | 1/2004 | Lennon et al. | |
| 2004/0064466 A1* | 4/2004 | Manikutty et al. ............ 707/100 |
| 2004/0143581 A1 | 7/2004 | Bohannon et al. | |

(Continued)

OTHER PUBLICATIONS

Jonathan Gennick, SQL in, XML out, May/Jun. 2003, Oracle p. 1-5.*

(Continued)

*Primary Examiner* — Amy Ng
(74) *Attorney, Agent, or Firm* — Hickman Palermo Truong Becker Bingham Wong LLP (57) ABSTRACT

Techniques for effectively and efficiently supporting XML sequence type and XQuery sequence natively in a SQL system are described. According to one aspect, SQL functions that correctly handle XML sequences are provided. Thus, XML sequences are handled effectively. According to another aspect, rules for simplifying an abstract syntax tree (AST) that represents one or more such SQL functions are provided. For each such SQL function that is represented in an AST that represents a SQL query, one or more rules that are relevant to that SQL function are determined. Relevant rules are applied to the representation of the SQL function within the AST. Through the application of the rules to the representations of the SQL functions within the AST, the AST is modified in a manner that simplifies the AST prior to the evaluation of the AST at query execution time. Thus, XML sequences are handled efficiently.

10 Claims, 3 Drawing Sheets

U.S. PATENT DOCUMENTS

| | | | |
|---|---|---|---|
| 2004/0148278 | A1 | 7/2004 | Milo et al. |
| 2004/0167904 | A1 | 8/2004 | Wen et al. |
| 2004/0193575 | A1 | 9/2004 | Chen et al. |
| 2004/0260691 | A1 | 12/2004 | Desai et al. |
| 2004/0267760 | A1 | 12/2004 | Brundage et al. |
| 2005/0004892 | A1 | 1/2005 | Brundage et al. |
| 2005/0022115 | A1 | 1/2005 | Baumgartner et al. |
| 2005/0097084 | A1* | 5/2005 | Balmin et al. ............... 707/3 |
| 2005/0138047 | A1 | 6/2005 | Liu et al. ............... 707/100 |
| 2005/0160076 | A1 | 7/2005 | Kanemasa |
| 2005/0210002 | A1* | 9/2005 | Pal et al. ............... 707/3 |
| 2005/0289125 | A1 | 12/2005 | Liu et al. |
| 2006/0010124 | A1* | 1/2006 | Lucas et al. ............... 707/4 |
| 2006/0031233 | A1 | 2/2006 | Liu et al. |

OTHER PUBLICATIONS

IP Australia, "Examiner's Report No. 2," Patent App. 2001290693, received Mar. 8, 2007, 2 pages.

Current Claims Patent App. 2001290693 (50277-2175), 7 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

International Preli Minary Examining Authority, "Written Opinion," PCT/US2005/021259, dated Oct. 13, 2006, 7 pages.

Current Claims, PCT/US2005/021259, 10 pages.

Australian Office Action; Examiner's first report on patent application No. 2001290693, dated Jun. 27, 2006, 4 pgs.

Australian Application No. 2001290693—current claims, 17 pgs.

Chen, Cindy Xinmin, et al., "XML Queries SQL," Proceedings of the First International Conference on Web-Age Information Management, ISBN: 3-540-67627-9, 8 pages.

Cheng, Josephine, el al., "XML and DB2," 16$^{th}$ International Conference on Data Engineering, May 2000, 5 pages.

European Patent Office, "Communication Pursuant to Article 96(2) EPC," App. No. 01 970 715.7 (50277-2177), sated Jul. 19, 2006, 8 pages.

Amended Claims (50277-2177), App. No. 01 970 715.7, 13 pages.

Florescu, Daniela et al., "A Performance Evaluation of Alternative Mapping Schemes for Storing XML Data in a Relational Database," INRIA Rocquencourt P Project Rodin—Rapport De Recherche, May 1999, pp. 1-31.

Banarjee, Sandeepan, et al., "Oracle 8i—The XML Enabled Data Management System," Proceedings 16$^{th}$ International Conference on Data Engineering, Feb. 29, 2000, pp. 561-568.

Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.

Zemke, Fred, "XMLQuery," Change Proposal, ISO/IEC JTCI/SC32 WG3:SIA-nnn ANSI NCITS H2-2004-021rL, Mar. 14, 2004, 29 pages.

International Searching Authority, "Notification of Transmittal of the International Search Report and the Written Opinion of the International Searching Authority, or the Declaration," PCT/US2005/021259, dated Nov. 24, 2005, 13 pages.

Current Claims, PCT/US2005/021259, 15 pages.

Choi, Byron et al., "The XQuey Formal Semantics: A Foundation for Implementation Optimization," May 31, 2002, IEEE XP-002353605, 15 pages.

Funderbunk, J. et al., "XML programming with SQL/XML and XQuery", *IBM Systems Journal*, XP-002295973 (2002), pp. 642-665.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Murthy, Ravi et al., "XML Schemas in Oracle XML DB," Proceedings of the 29th VLDB Conference, 2003, IEEE XP-002353604, pp. 1009-1018.

Shanmugasundaram, Jayavel, et al., "Querying XML Views of Relational Data," Proceedings of the 27th Very Large Databases Conference, Rome, Italy, Sep. 2001, pp. 261-270.

Zhang, Hui et al., "XQuery rewriting at the relational algebra level," Computer Systems Science and Engineering, vol. 18, No. 5, Sep. 2003, IEEE XP-009056809, pp. 241-262.

Zhang, Xin et al., "Honey, I Shrunk the XQuery!—An XML Algebra Optimization Approach," Submission for WIDM'02, IEEE XP-002316448, 14 pages.

Oracle Technology Network "Code Listing 3: Use XMLAgg to aggregate XML elements," Oracle, 2005, located at http://www.oracle.com/technology/oramag/oracle/03-may/o33xml_13.html, 2 pages.

Oracle Corporation, Oracle 9i XML Database Developer's Guide—Oracle XML DB, Release 2 (9.2) Mar. 2002, pp. 1-908.

Office Action from China for foreign patent application No. 200480011704.3 dated Feb. 29, 2008 (6 pgs).

Current claims in China for foreign patent application No. 200480011704.3 (4 pgs).

Oracle 9I-XML Database Developer's Guide-Oracle, XML DB, Release 2(9.2), Part No. A96620-02, Part IV Chapter 10, 10-1 ~ 10-21, Shelley Higgins (24 pgs).

* cited by examiner

EFFECTIVELY AND EFFICIENTLY SUPPORTING XML SEQUENCE TYPE AND XQUERY SEQUENCE NATIVELY IN A SQL SYSTEM

RELATED APPLICATIONS

This application is related to U.S. patent application Ser. No. 10/948,523, entitled "EFFICIENT EVALUATION OF QUERIES USING TRANSLATION," by Zhen Hua Liu et al., filed on Sep. 22, 2004, the entire contents of which are incorporated by reference for all purposes as if originally set forth herein.

This application is related to U.S. patent application Ser. No. 10/259,278, entitled "MECHANISM FOR MAPPING XML SCHEMAS TO OBJECT-RELATIONAL DATABASE SYSTEMS," by Ravi Murthy et al., filed on Sep. 27, 2002, the entire contents of which are incorporated by reference for all purposes as if originally set forth herein.

This application is related to U.S. patent application Ser. No. 10/428,878, entitled "TECHNIQUES FOR REWRITING XML QUERIES DIRECTED TO RELATIONAL DATABASE CONSTRUCTS," by Anand Manikutty et al., filed on May 1, 2003, the entire contents of which are incorporated by reference for all purposes as if originally set forth herein.

This application is related to U.S. patent application Ser. No. 10/428,443, entitled "TECHNIQUES FOR RETAINING HIERARCHICAL INFORMATION IN MAPPING BETWEEN XML DOCUMENTS AND RELATIONAL DATA," by Ravi Murthy et al., filed on May 1, 2003, the entire contents of which are incorporated by reference for all purposes as if originally set forth herein.

This application is related to U.S. patent application Ser. No. 09/949,020, entitled "METHOD AND APPARATUS FOR XML VISUALIZATION OF A RELATIONAL DATABASE AND UNIVERSAL RESOURCE IDENTIFIERS TO DATABASE DATA AND METADATA," by Muralidhar Krishnaprasad et al., filed on Sep. 6, 2001, the entire contents of which are incorporated by reference for all purposes as if originally set forth herein.

This application is related to U.S. patent application Ser. No. 09/948,949, filed together herewith, entitled "APPARATUS AND METHOD FOR MAPPING RELATIONAL DATA AND METADATA TO XML," by Muralidhar Krishnaprasad et al., filed on Sep. 6, 2001, the entire contents of which are incorporated by reference for all purposes as if originally set forth herein.

This application is related to U.S. patent application Ser. No. 09/948,998, entitled "METHOD AND APPARATUS FOR FLEXIBLE STORAGE AND UNIFORM MANIPULATION OF XML DATA IN A RELATIONAL DATABASE SYSTEM," by Muralidhar Krishnaprasad et al., filed on Sep. 6, 2001, the entire contents of which are incorporated by reference for all purposes as if originally set forth herein.

FIELD OF THE INVENTION

The present invention relates to query processing. The invention relates more specifically to techniques for effectively and efficiently supporting XML sequence type and XQuery sequence natively in a SQL system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational database management systems (RDBMSs) store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

As is well known, each column of a relational table is associated with a data type, and all information within a particular column is required to conform to the particular column's data type. For example, only numbers can be stored in a column that is associated with the "number" data type.

Extensible Markup Language (XML) provides a convenient way to express information in a hierarchically structured format. XML-formatted information can be stored within a relational table. According to current approaches, any relational table column that stores XML-formatted information in a "native" format, such that the structure of the XML information is preserved, is associated with one of two types: an XMLType(document) type, or an XMLType(content) type. Only XMLType(document) type instances can be stored in an XMLType(document) type column, and only XMLType(content) type instances can be stored in an XMLType(content) type column.

A user retrieves information from and makes updates to a database by interacting with a database application. The user's actions are converted into a query by the database application. The database application submits the query to a database server. The database server responds to the query by accessing the tables specified in the query to determine which information stored in the tables satisfies the query. The information that satisfies the query is retrieved by the database server and transmitted to the database application. Alternatively, a user may request information directly from the database server by constructing and submitting a query directly to the database server using a command line or graphical interface.

Queries submitted to the database server must conform to the syntactical rules of a database query language. One popular database query language, known as the Structured Query Language (SQL), provides users a variety of ways to specify information to be retrieved from relational tables.

Although not necessarily a database query language, a new language for querying information contained in XML documents was recently conceived: XML Query Language (XQuery). XQuery is based on XML, and is described in "XQuery 1.0: An XML Query Language," W3C Working Draft 29 Oct. 2004. Another related technology, XPath, is described in "XML Path Language (XPath) 2.0," W3C Working Draft 29 Oct. 2004. XQuery may use XPath for path traversal.

When a SQL query is executed, the results are returned as a row set, which is a set of rows. In contrast, when an XQuery query is executed, the results are returned as an instance of XMLType(sequence) type. In XQuery terminology, the result of an XQuery is an instance of XQuery data model. In SQL/XML terminology, the result of an XQuery is an instance of XMLType(sequence) type.

As described in "XQuery 1.0 and XPath 2.0 Data Model," W3C Working Draft Oct. 29, 2004, an XML sequence is sequence of items. Each item may be either a node or an atomic value. The entire contents of "XQuery 1.0 and XPath 2.0 Data Model" are incorporated by reference for all purposes as though fully set forth herein.

There are some significant differences between XMLType (sequence) type instances and XMLType(document) type instances or XMLType(content) type instances. Unlike XMLType(document) type instances and XMLType(content) type instances, XMLType(sequence) type instances do not have a multi-tiered hierarchical structure. XMLType(document) type instances and XMLType(content) type instances consist of a document node that is the parent of one or more child nodes, but XMLType(sequence) type instances do not contain such a parent document node. XMLType(sequence) type instances are organizationally "flat." There is no nested sequence within an XMLType(sequence) type instance. However, each item of the sequence can be a node having hierarchical structures.

Also, unlike XMLType(sequence) type instances, XMLType(document) type instances and XMLType(content) type instances do not allow for the representation of atomic values that are not nodes. Everything within an XMLType(document) type instance or an XMLType(content) type instance is a node of some kind. This is significant, because, for example, if an XQuery query processor were to be asked whether a node is an instance of an atomic value, the query processor would respond negatively. Thus, if XMLType(sequence) type instances are "serialized" into XMLType(content) type instances, important information may be lost in translation.

Although at least one currently available RDBMS provides SQL functions to manipulate XMLType(document) type instances and XMLType(content) type instances that are contained in relational tables, these functions are not designed to operate on XMLType(sequence) type instances. Because of the differences between XMLType(sequence) type instances and XMLType(content) type instances, some of which are described above, none of these functions, as they are currently implemented, operates correctly relative to XMLType(sequence) type instances.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques for effectively and efficiently supporting XML sequence type and XQuery sequence natively in a SQL system are described. According to one aspect of the techniques, SQL functions that correctly handle XML sequences (also called XQuery sequences) semantics are constructed. For example, SQL functions that convert XMLType(sequence) type instances into XMLType(content) type instances, and that convert XMLType(content) type instances into XMLType(sequence) type instances, are described below. Existing SQL query processors can be enhanced to recognize and evaluate such SQL functions. Thus, XML sequences are handled effectively.

Furthermore, according to another aspect of the techniques, rules for simplifying an abstract syntax tree (AST) that represents one or more such SQL functions are provided. For each such SQL function that is represented in an AST that represents a SQL query, one or more rules that are relevant to that SQL function may be determined. Relevant rules are applied to the representation of the SQL function within the AST. Through the application of the rules to the representations of the SQL functions within the AST, the AST is modified in a manner that simplifies the AST prior to the evaluation of the AST at query execution time. A SQL query processor can evaluate a simplified AST at a lower computational expense. Thus, XML sequences are handled efficiently as well.

Database Architecture

Figure 1:
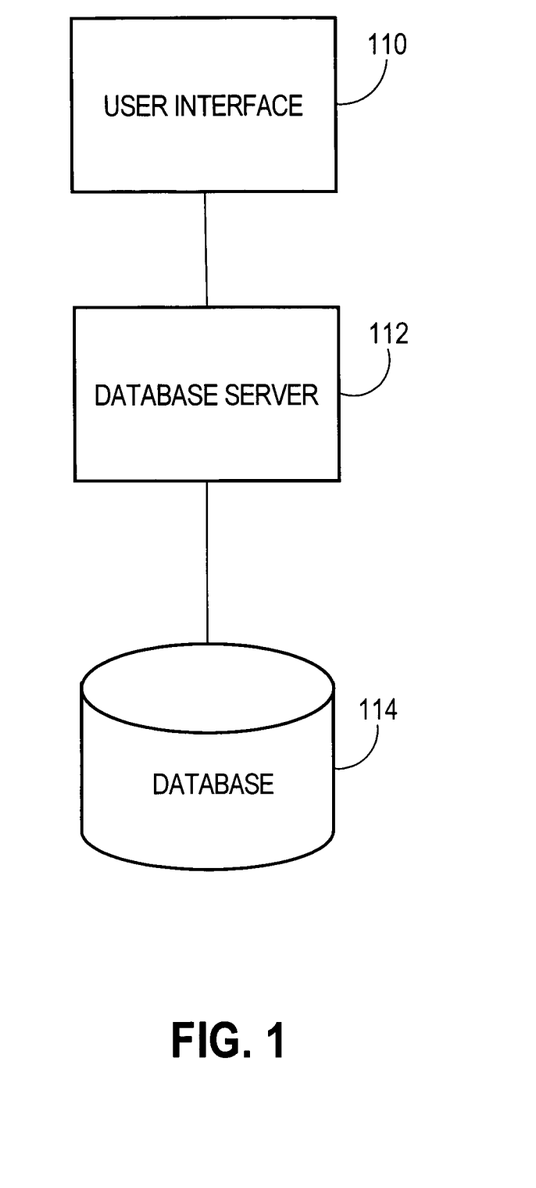
FIG. 1 is a block diagram showing a database architecture that may be used to implement an embodiment of the present invention.

Before the techniques referred to above are described in detail, an example system in which the techniques may be used is briefly described. FIG. 1 is a block diagram showing a database architecture that may be used to implement an embodiment of the present invention. The architecture comprises a user interface 110, a database server 112, and a database 114. Database server 112 interacts with the user via user interface 110, and accesses and maintains database 114 in accordance with the user input. Database server 112 may also interact with other systems (not shown).

In general, database server 112 creates a database by organizing information in one or more tables. The organization of the table is referred to as a definition. An index is a structure that is used for accessing particular information in the table more quickly. Therefore, a table definition supports any access mechanism to the data (search by name, by ID, by date, etc.), whereas an index is designed for a specific access method. The index itself is generally not the authoritative source of the data, but rather contains pointers to the disk addresses of the tables storing the authoritative data.

Database server 112 contains a SQL query processor, which receives SQL queries as input, constructs ASTs to represent those queries, applies rules to simplify the ASTs, and evaluates the ASTs to execute the queries, thereby retrieving data from and/or manipulating data within database 114. Techniques for constructing an AST that incorporates XQuery functionality are described in U.S. patent application Ser. No. 10/948,523, referred to above.

XMLType

The system shown in FIG. 1 supports "XML" or "XMLType" as a native datatype. Using XMLType, users can store XML documents in databases via the use of XML tables or XMLType columns of tables. Furthermore, users can convert their relational data into XMLType views via the use of SQL/XML publishing functions, such as XMLELEMENT( ), XMLCONCAT( ), etc. For more information on these functions, the reader is referred to *Oracle Database SQL Reference* 10g *Release* 1 (10.1), the entire contents of which are incorporated by reference for all purposes as though fully set forth herein. XQuery can be used in SQL through a function such as XMLQUERY, which enables queries on XMLType values. The XMLTABLE function enables one to convert XML values (possibly from one or more XMLType columns, or values returned from an XQuery) into a virtual relational table.

According to one embodiment, an XMLType column of a relational table is actually associated with one of three major types: XMLType(DOCUMENT), XMLType(CONTENT), or XMLType(SEQUENCE). Columns of XMLType(DOCUMENT) can contain XMLType(document) type instances. Columns of XMLType(CONTENT) can contain XMLType(content) type instances. Columns of XMLType(SEQUENCE) can contain XMLType(sequence) type instances.

SQL Functions for XML Sequences

Several different SQL functions for handling and/or producing XML sequences are described below. Although such SQL functions might be used within SQL queries directly, typically, a SQL query containing an invocation of XQuery embedded in the XMLQuery( ) function or XMLTABLE construct is translated into a SQL query with these SQL functions manipulating XMLType(sequence). Each occurrence of such SQL functions is actually produced by the rewrite of XQuery used in XMLQuery( ) or XMLTable as described in U.S. patent application Ser. No. 10/948,523, entitled "EFFICIENT EVALUATION OF QUERIES USING TRANSLATION". The SQL functions described below either accept an XMLType(sequence) as an input parameter, or produce an XMLType(sequence) as an output parameter (i.e., as a result of the function). Some of the SQL functions described below may do both.

To process a SQL query that is translated from the original SQL query containing an invocation of XQuery in XMLQuery( ) or XMLTable construct and thus contains one or more of the SQL functions described below, a query processor optimizes the invocation of these SQL functions during query compilation time using a set of algebra rules. The query processor then evaluates these SQL functions during query execution time.

SQL Scalar Value/XML Sequence Conversion Functions

The SQL function PKSQL2XML( ) converts a SQL scalar value into an XML sequence. The resulting XML sequence is a sequence of one item, which is an XQuery atomic value rather than an XQuery node. The XQuery atomic value is equal, mathematically, to the original SQL scalar value.

According to one embodiment, the syntax for PKSQL2XML( ) is as follows:
PKSQL2XML(s, sqltype, xquerytype)
where "s" is a SQL scalar value (e.g., "45"), "sqltype" is the SQL type of the scalar value (e.g., "sql:integer"), and "xquerytype" is the XQuery atomic value type (e.g., "xs:integer"). Because there are many XQuery atomic value types into which a particular SQL scalar value could be cast, the "xquerytype" parameter gives a user the opportunity to specify the XQuery atomic value type of PKSQL2XML( )'s resulting output parameter.

The SQL function UPKXML2SQL( ) is the inverse of PKSQL2XML( ). The SQL function UPKXML2SQL( ) converts an XML sequence of one item—an XQuery atomic value—into a SQL scalar value. The resulting SQL scalar value is equal, mathematically, to the original XQuery atomic value.

According to one embodiment, the syntax for UPKXML2SQL( ) is as follows:
UPKXML2SQL(x, xquerytype, sqltype)
where "x" is an XML sequence containing an XQuery atomic value, "xquerytype" is the XQuery atomic value type (e.g., "xs:integer"), and "sqltype" is the SQL type of the scalar value (e.g., "sql:integer").

Range Construction Function

The SQL function XQRNG( ) receives two integers as input and produces an XML sequence that represents a range of integers starting with the first integer and ending with the second integer.

The resulting XML sequence is actually a sequence of atomic values that starts with an XQuery atomic value that is mathematically equal to the first integer and ends with an XQuery atomic value that is mathematically equal to the second integer. For each particular integer between the first and second integers in the integer domain, the resulting XML sequence also contains a separate XQuery atomic value that is mathematically equal to the particular integer. The XQuery atomic values in the resulting XML sequence are in numerically ascending order.

According to one embodiment, the syntax for XQRNG( ) is as follows:
XQRNG(integer, integer).

XML Content/XML Sequence Conversion Functions

The SQL function SEQ2CON( ) converts an instance of XMLType(sequence) type into an instance of XMLType(content) type. For each item in the original XMLType(sequence) type instance, the resulting XMLType(content) type instance contains a corresponding node. The resulting XMLType(content) instancealso contains a document node to which the other nodes in the resulting object are hierarchically subordinate.

According to one embodiment, the syntax for SEQ2CON( ) is as follows:
SEQ2CON(seq)
where "seq" is an object of XML sequence type.

The SQL function CON2SEQ( ) is the inverse of SEQ2CON( ). The SQL function CON2SEQ( ) converts an instance of XMLType(content) type into an instance of XMLType(sequence) type. The resulting XMLType(sequence) type instance contains one or more nodes. Each such node corresponds to a separate node within the original XMLType(content) type instance.

According to one embodiment, the XML content-to-XML sequence conversion involves ignoring the top-level document node in the original XMLType(content) type instance, and adding nodes to the resulting XMLType(sequence) type instance for each child node of the top-level document node.

According to one embodiment, the syntax for CON2SEQ( ) is as follows:
CON2SEQ(con)
where "con" is an object of XML content type.

XML Sequence Construction Function

The SQL function XQCONCAT( ) receives one or more input parameters that may be instances of any XML types (e.g., XMLType(document), XMLType(content), XMLType (sequence), etc.), and produces an XMLType(sequence) as an output parameter. For each particular input parameter, the resulting XML sequence contains a separate item that represents the particular input parameter. In one embodiment, the items in the resulting XML sequence are in the same order as the input parameters that those items represent. If the input parameter is an instance of XMLType(sequence) type, then every item in the XMLType(sequence) type becomes an item in the resulting XML sequence. This is because there is no concept of nested sequences in XMLType(sequence) types.

According to one embodiment, the syntax for XQCONCAT( ) is as follows:
XQCONCAT(xmlinstance [xmlinstance . . . ])
where each "xmlinstance" is an instance that is of some XML type.

XML Sequence Aggregation Function

The SQL function XQAGG( ) receives, as an input parameter, a SQL collectionof one or more XMLType instances (e.g., XMLType(document), XMLType(content), XMLType (sequence), etc.), and produces an XMLType(sequence) as an output parameter. For each particular XMLType instance in the original SQL collection, the resulting XML sequence contains a separate item that represents that XMLType instance. If the instance is of XMLType(sequence) type, then every item in the XMLType(sequence) type becomes an item in the resulting XML sequence, because there is no concept of nested sequences in XMLType(sequence) types.

For example, the original SQL collection may be a row set that is the result of a SQL query; thus, each XMLType instance in the original SQL collection may be computed from a separate row from the SQL query. The resulting XML sequence from XQAGG( ) may be stored in a relational table column that is of XMLTYPE(SEQUENCE) type.

According to one embodiment, the syntax for XQAGG( ) is as follows:
XQAGG(collection)
where "collection" is a reference to a SQL collection of instances (e.g., a SQL row set), each of which is of some XML type.

XML Sequence-to-Collection Conversion Function

The SQL function XQSEQUENCE( ) may be viewed as the inverse function of XQAGG( ) described above; XQAGG( ) converts a SQL collection of XMLType instances into one instance of XMLType(sequence), and XQSEQUENCE( ) converts an instance of XMLType(sequence) into a SQL collection of XMLType instances.

XQSEQUENCE( ) receives an XMLType (sequence) instance as an input parameter and returns, as an output parameter, a SQL collection of one or more XMLType instances. For each particular item in the original sequence, the resulting SQL collection contains a separate XMLType instance that represents the particular item.

For example, the resulting SQL collection may be logically considered as a row set; thus, each XMLType instance in the resulting SQL collection becomes a separate row. The resulting SQL collection may then be provided as an input parameter to the SQL TABLE( ) function to generate a virtual table, from which a SQL query can select rows.

According to one embodiment, the syntax for XQSEQUENCE( ) is as follows:
XQSEQUENCE(seq)
where "seq" is an object of XML sequence type.

XPath Application Function

The SQL function XQEXTRACT( ) is similar to the existing SQL function EXTRACT( ), in that it applies a specified XPath expression to an XMLType instance to determine nodes which are hierarchically located so as to satisfy the XPath expression. However, while EXTRACT( ) return an instance that is of XMLType(content) type, XQEXTRACT( ) instead returns an instance that is of XMLType(sequence) type.

According to one embodiment, the syntax for XQEXTRACT( ) is as follows:
XQEXTRACT(seq, xp)
where "seq" is an object of XML sequence type and "xp" is an XPath expression.

XML Sequence Value Extraction Function

The SQL function XQEXTRACTVAL( ) receives, as an input parameter, an XML sequence of a single item that is a node. XQEXTRACTVAL( ) applies the XPath expression "//text( )" to the item node to obtain the concatenation of all text value of text nodes under the item node. XQEXTRACTVAL( ) returns, as an output parameter, an instance of XMLType(content) type.

According to one embodiment, the syntax for XQEXTRACTVAL( ) is as follows: follows:
XQEXTRACTVAL(seq)
where "seq" is an XMLType(sequence) type instance that contains a single item, which is a node.

Simplifying an Abstract Syntax Tree that Represent SQL XML Sequence Functions As is discussed above, an AST that represents one or more of the foregoing SQL XML sequence functions can be simplified prior to evaluation by applying, to each such function, one or more rules that are relevant to that function. For each such SQL function that is represented in an AST, one or more rules that are relevant to that SQL function may be determined. Relevant rules are applied to the representation of the corresponding SQL function within the AST. Such rules are sometimes called "algebra rules."

Figure 2:
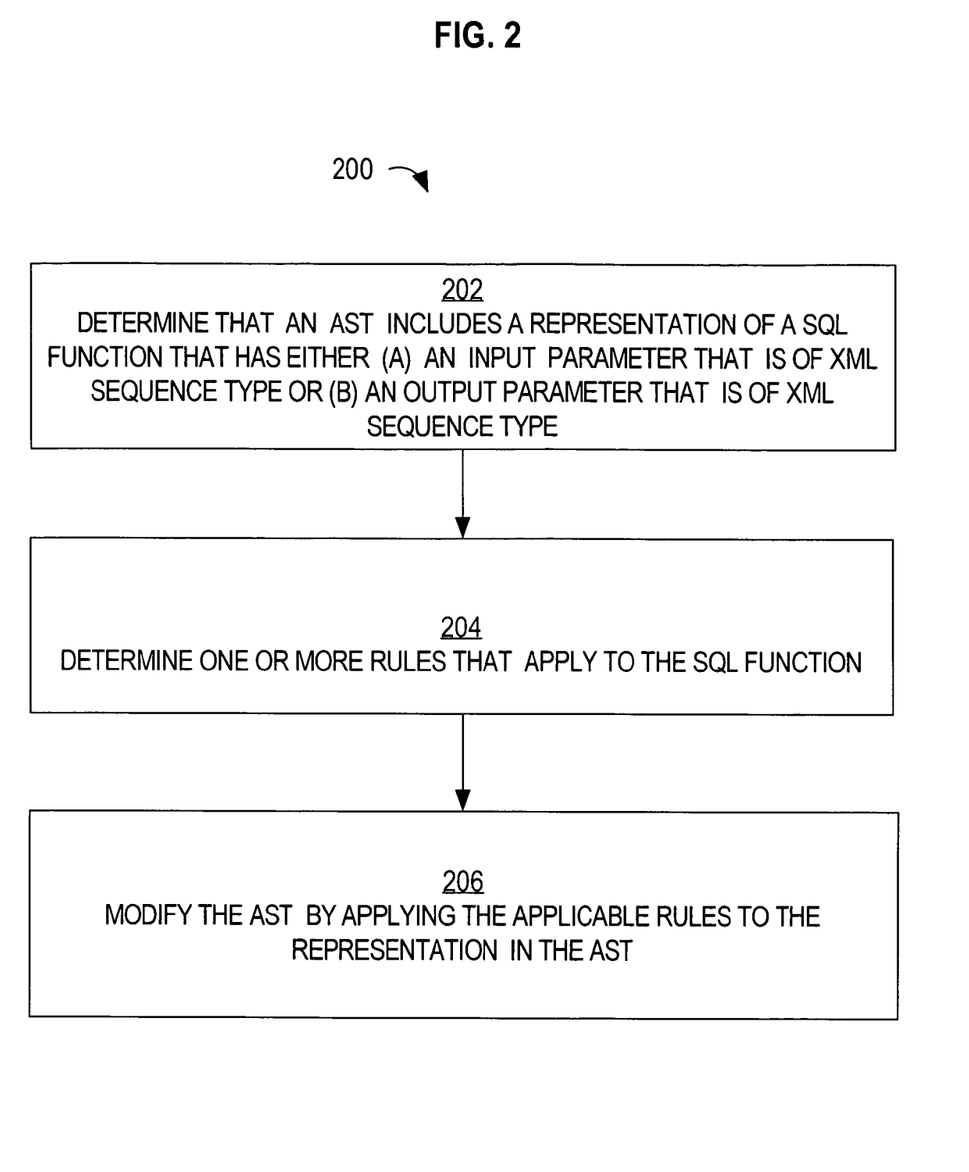
FIG. 2 is a flow diagram that illustrates an overview of a technique for simplifying an AST that represents a SQL query that contains XML sequence functions.

FIG. 2 is a flow diagram that illustrates an overview of a technique for simplifying an AST that represents a SQL query that contains XML sequence functions, such as are described above. A query processor of database server 112 may perform the technique, for example.

In block 202, it is determined that an AST includes a representation of a SQL function that either (a) has an input parameter that is of XML sequence type or (b) has an output parameter that is of XML sequence type. For example, a query processor may determine that an AST contains a representation of SEQ2CON( ) or CON2SEQ( ).

In block 204, in response to the determination of block 202, one or more rules that apply to the SQL function are determined. For example, in response to determining that the AST contains a representation of CON2SEQ( ), the query processor may determine a set of rules that apply to CON2SEQ( ). Depending on the specific usage of CON2SEQ( ), one or more of the rules may or may not apply. Some rules apply only to certain combinations of SQL functions, some of which are described in greater detail below.

In block 206, prior to evaluating the AST to execute a SQL query that the AST represents, the AST is modified through the application of the rules determined in block 204 to the representation of the SQL function in the AST. For example, the query processor may translate the representation of CON2SEQ( ) into a representation of a different SQL function, a different combination of SQL functions, or an expression that may or may not include SQL functions. Such an expression may include one or more input parameters of the SQL function to which the rules are applied.

In many cases, the SQL functions described above and the rules described below allow existing mechanisms within a query processor to be used to evaluate a query that operates on or otherwise uses XMLType(sequence) type instances. Existing operators that are already used relative to instances of XMLType(content) or XMLType(document) can be used to evaluate SQL queries that contain XMLType(sequence) type instances or expressions, such as XQuery queries, that evaluate to XMLType(sequence) type instances. Thus, for example, a query processor developer would not need to implement an "equal" comparison operator specifically for XMLType(sequence) type instances which are actually XMLType(content) instances if an "equal" comparison operator already existed for XMLType(content) type instances; instead, the query processor could convert XMLType(sequence) type instances into XMLType(content) type instances, and then the query processor could apply the "XML content equal" comparison operator to the XMLType (content) type instances to produce a result. Afterward, the query processor could convert the XMLType(content) type instances back into XMLType(sequence) type instances if needed.

Some rules, and the SQL functions to which they apply, are described below. Each rule specifies a pattern that may be detected within an AST, and a result to which the SQL functions matching the pattern are to be translated. Several passes may be made over an AST in determining and applying relevant rules, so SQL functions or expressions may mutate multiple times if some rules become applicable as the result of applying other rules. In one embodiment, when a pass over the AST results in no additional changes, then the application of the rules to the AST is complete. Although all of the following rules are implemented in one embodiment, in other alternative embodiments, one or more of the following rules may be omitted.

The Null In/Out Rule

The "null in/out" rule applies to several of the SQL functions introduced herein. More specifically, in one embodiment, the null in/out rule is applicable to the following SQL functions: UPKXML2SQL( ), PKSQL2XML( ), XQRANGE( ), SEQ2CON( ), CON2SEQ( ), XQCONCAT( ), and XQEXTRACT( ).

In the following description, all of the above SQL functions are generically represented as OPR( ). Using this notation, the null in/out rule states that occurrences of OPR(NULL) should be changed to NULL instead. Thus, for example, in an AST, PKSQL2XML(NULL) would be changed to NULL instead.

The Case Distribution Rule

The "case distribution" rule also applies to several of the SQL functions introduced herein. More specifically, in one embodiment, the case distribution rule is applicable to the following SQL functions: UPKXML2SQL( ), CON2SEQ( ), SEQ2CON( ), and XQEXTRACT( ).

Again, in the following description, all of the above SQL functions are generically represented as OPR( ). Using this notation, the case distribution rule states that occurrences, in an AST, of an expression OPR(CASE WHEN cond1 THEN expr1 WHEN cond2 THEN expr2 . . . ELSE expr2)

should be changed, in the AST, to occurrences of the following expression instead:

CASE WHEN cond1 THEN OPR(expr1) WHEN cond2 THEN OPR(expr2) . . . ELSE OPR(exprn).

The Scalar Subquery Pushdown Rule

The "scalar subquery pushdown" rule also applies to several of the SQL functions introduced herein. More specifically, in one embodiment, the scalar subquery pushdown rule is applicable to the following SQL functions: UPKXML2SQL( ), CON2SEQ( ), SEQ2CON( ), and XQEXTRACT( ).

Again, in the following description, all of the above SQL functions are generically represented as OPR( ). Using this notation, the scalar subquery pushdown rule states that occurrences, in an AST, of an expression OPR(SELECT expr FROM t)

should be changed, in the AST, to occurrences of the following expression instead:

(SELECT OPR(expr) FROM t)

Thus, for example, in an AST, the expression "PKXML2SQL(SELECT name FROM employee)" would be changed to "(SELECT PKXML2SQL(name) FROM employee)" instead.

Rules Applicable Specifically to UPKXML2SQL( )

Expressions that match the following pattern are changed, in the AST, merely to "s" as contained in the expression:

UPKXML2SQL(PKSQL2XML(s, sqltype, xqtype), xqtype, sqltype))

where "sqltype" and "xqtype" within PKSQL2XML( ) are the same as their counterparts within UPKXML2SQL( ), and "s" is a SQL scalar value (e.g., "45"). Thus, for example, the following expression would be changed, in the AST, simply to "45":

UPKXML2SQL(PKSQL2XML(45, sql:integer, xs:integer), xs:integer, sql:integer).

Rules Applicable Specifically to SEQ2CON( )

If "c" in the expression "SEQ2CON(c)" is of XMLType (CONTENT), then the expression is changed simply to "c".

If "c" in the expression "SEQ2CON(CON2SEQ(c))" is of any of a group of specified XML content types, then the expression is changed simply to "c". According to one embodiment, for purposes of this rule, the specified XML content types are XMLType(CONTENT(element*)), XMLType(CONTENT(comment( )*), XMLType(CONTENT (text( )?)), and XMLType(CONTENTpi( )*)). In the foregoing notation, the character "*" means zero or more occurrences, and the character "?" means zero or one occurrences.

If "c" in the expression "SEQ2CON(XQAGG(c))" is of XMLType(CONTENT(element)), then the expression is changed simply to "XMLAGG(c)". The XMLAGG( ) function is described in *Oracle Database SQL Reference* 10g *Release* 1 (10.1), referred to above.

If "x" in the expression "SEQ2CON(XQAGG(x))" is of XMLType(SEQUENCE(element)), then the expression is changed to "XMLAGG(SEQ2CON(x))".

The expression "SEQ2CON(XQEXTRACT(c, path))" is changed to "EXTRACT(c, path))" if "c" is of any of a group of specified XML content types. According to one embodiment, for purposes of this rule, the specified XML content types are XMLType(CONTENT(element*)), XMLType (CONTENT(text( )?), XMLType(CONTENT(pi( )?)), and XMLType(CONTENT(comment( )?)). In the foregoing notation, the character "*" means zero or more occurrences, and the character "?" means zero or one occurrences. The EXTRACT( ) function is described in *Oracle Database SQL Reference* 10g *Release* 1 (10.1), referred to above.

Rules Applicable Specifically to CON2SEQ( )

If "x" in the expression "CON2SEQ(SEQ2CON(x))" is of XMLType(SEQUENCE(element*)), then the expression is changed simply to "x". In the foregoing notation, the character "*" means zero or more occurrences.

If "c" in the expression "CON2SEQ(XMLAGG(c))" is of XMLType(CONTENT(element)), then the expression is changed to "XQAGG(CON2SEQ(c))". In the foregoing notation, the character "*" means zero or more occurrences. The XMLAGG( ) function is described in *Oracle Database SQL Reference* 10g *Release* 1 (10.1), referred to above.

Rules Applicable Specifically to XQCONCAT( )

The expression "XQCONCAT(x)" is changed simply to "x".

Input parameters of a first instance of XQCONCAT( ) that is itself nested as an input parameter of a second instance of XQCONCAT( ) become input parameters of the second instance instead, and the first instance is removed. Thus, for example, the expression "XQCONCAT(x1, XQCONCAT (x2, x3), x4)" is changed to "XQCONCAT(x1, x2, x3, x4)" instead. The input parameters "x2" and "x3", added to the second instance, retain the position of the removed first instance relative to the input parameters "x1" and "x4" already in the second instance.

The expression "XQCONCAT(x1, x2, . . . xn)" is changed to "CON2SEQ(XMLCONCAT(SEQ2CON(x1), SEQ2CON (x2), . . . SEQ2CON(xn))" if all of the input parameters "x1" through "xn" of the original XQCONCAT( ) expression are of XMLType(SEQUENCE(element)).

Rules Applicable Specifically to XQAGG( )

The expression "SELECT XQAGG(x) FROM t" is changed to "CON2SEQ(SELECT (XMLAGG(SEQ2CON (x)) FROM t)" if "x" is of XMLType(SEQUENCE(element*)). The XMLAGG( ) function is described in *Oracle Database SQL Reference* 10g *Release* 1 (10.1), referred to above.

The expression "SELECT XQAGG(NULL) FROM t" is simply changed to "NULL".

Rules Applicable Specifically to XQEXTRACT( )

The expression "XQEXTRACT(x, path)" is changed to "CON2SEQ(EXTRACT(SEQ2CON(x), path))" if (a) "x" is of XMLType(SEQUENCE(element*)) and (b) the original expression's output parameter (return value) is of any of a group of specified XML sequence types. According to one embodiment, for purposes of this rule, the specified XML sequence types are XMLType(SEQUENCE(element*)), XMLType(SEQUENCE(text( )?), XMLType(SEQUENCE (pi( )?)), and XMLType(SEQUENCE(comment( )?)). In the foregoing notation, the character "*" means zero or more occurrences, and the character "?" means zero or one occurrences. The EXTRACT( ) function is described in *Oracle Database SQL Reference* 10g *Release* 1 (10.1), referred to above.

The expression "XQEXTRACT(c, path)" is changed to "CON2SEQ(EXTRACT(c, path))" if (a) "c" is of XMLType (CONTENT(element*)) and (b) the original expression's output parameter (return value) is of any of a group of specified XML sequence types. According to one embodiment, for purposes of this rule, the specified XML sequence types are XMLType(SEQUENCE(element*)), XMLType(SEQUENCE(text( )?), XMLType(SEQUENCE(pi( )?)), and XMLType(SEQUENCE(comment( )?)).

Rules Applicable to Combinations of Aggregate and Sequence Functions

The expression "SELECT VALUE(v) FROM TABLE (XMLSEQUENCE((SELECT XMLAGG(c) FROM t))) v=SELECT VALUE(v) FROM (SELECT c FROM t)" is changed to "SELECT c FROM t" if "c" is of XMLType (CONTENT(element?)). In the foregoing notation, the character "?" means zero or one occurrences. The XMLSEQUENCE( ), XMLAGG( ), VALUE( ), and TABLE( ) functions are described in *Oracle Database SQL Reference* 10g *Release* 1 (10.1), referred to above.

The expression "SELECT VALUE(v) FROM TABLE(XQSEQUENCE((SELECT XQAGG(i) FROM t))) v=SELECT VALUE(v) FROM (SELECT i FROM t)" is changed to "SELECT i FROM t" if "i" is of XMLType(SEQUENCE(item?)).

The expression "SELECT VALUE(v) FROM TABLE(XQSEQUENCE (x))" is changed to "SELECT CON2SEQ (VALUE(v)) FROM TABLE(XMLSEQUENCE(x)) v" if "x" is of XMLType(SEQUENCE(element*)).

The XMLSEQUENCE( ) and XQSEQUENCE( ) Conversion Rules

The expression "SELECT VALUE(v) FROM TABLE (XQSEQUENCE(CON2SEQ(c))) v" is changed to "SELECT SEQ2CON(VALUE(v)) FROM TABLE (XMLSEQUENCE(c)) v" if "c" is of XMLType(CONTENT (element*)).

The expression "SELECT VALUE(v) FROM TABLE(XQSEQUENCE(x)) v" is changed to "SELECT CON2SEQ(v) FROM TABLE(XMLSEQUENCE(SEQ2CON(x)) v" if "x" is of XMLType(SEQUENCE(element*)).

Rules Applicable to SQL/XML Publishing Functions

The "SQL/XML publishing functions" include XMLELEMENT( ), XMLFOREST( ), XMLAGG( ), and XMLCONCAT( ), all of which are described in *Oracle Database SQL Reference* 10g *Release* 1 (10.1), referred to above. In the following description, the generic function F( ) represents any of the SQL/XML publishing functions.

The expression "F(x RETURNING SEQUENCE)" is changed to "CON2SEQ(F(x RETURNING CONTENT))".

The expression "XMLCONCAT(c1, c2, . . . cn)" is changed to "SEQ2CON(XQCONCAT(CON2SEQ(c1), CON2SEQ(c2), . . . CON2SEQ(cn)))" if all of the input parameters "c1" through "cn" of the original XMLCONCAT( ) expression are of XMLType(CONTENT(element)).

The expression "SELECT XMLAGG(c) FROM t" is changed to "SELECT SEQ2CON(XQAGG(CON2SEQ(c))) FROM t" if "c" is of XMLType(CONTENT(element)).

Hardware Overview

Figure 3:
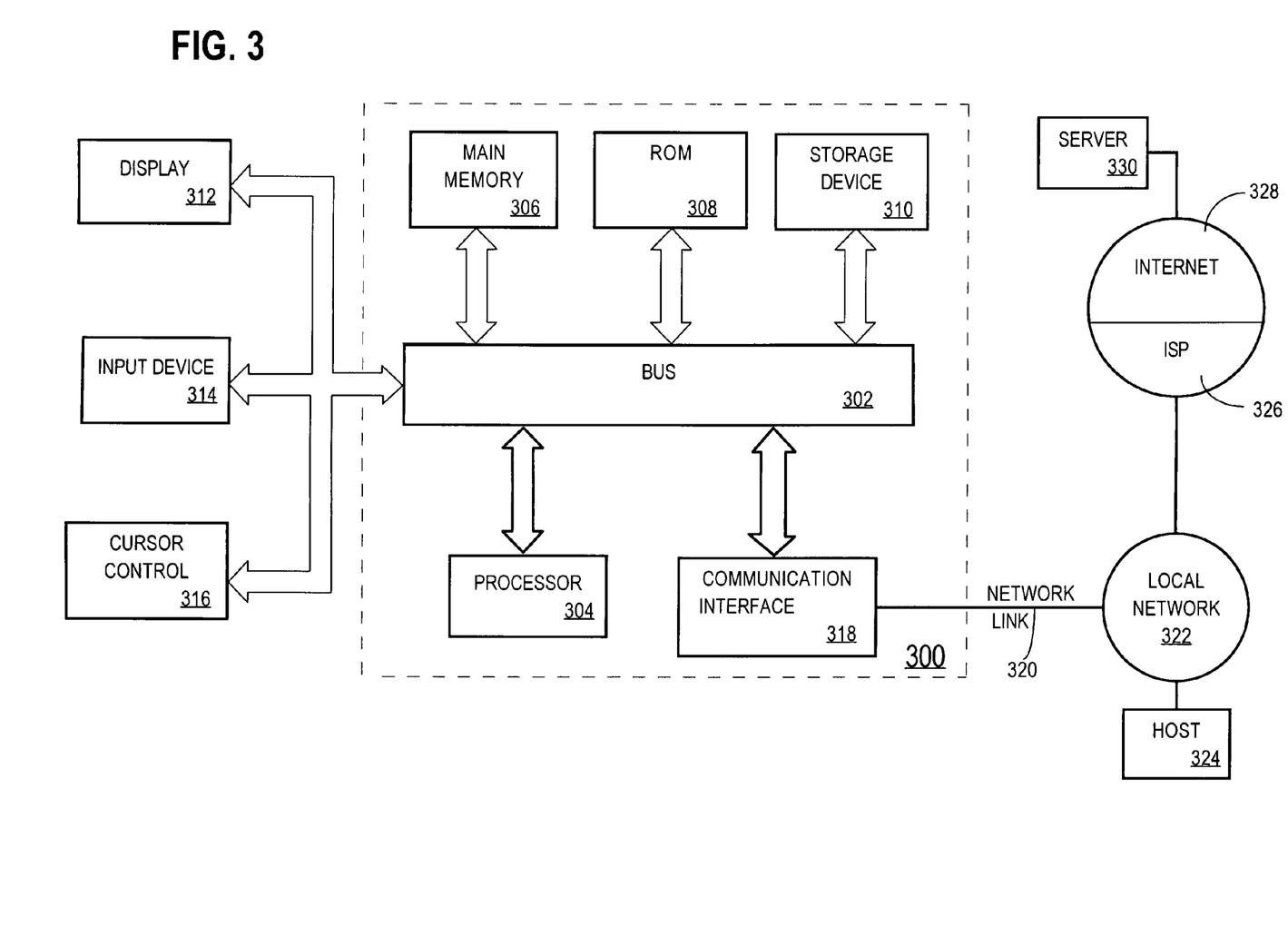
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of simplifying an abstract syntax tree that represents a query, comprising:
   determining whether the abstract syntax tree includes a representation of a first Structured Query Language (SQL) function that either (a) has an input parameter that is of Extensible Markup Language (XML) sequence type or (b) has an output parameter that is of XML sequence type; and
   in response to a determination that the abstract syntax tree includes the representation, determining one or more rules that apply to the first SQL function; and
   prior to evaluating the abstract syntax tree to execute the query, modifying the abstract syntax tree by applying the one or more rules to the first SQL function in the abstract syntax tree;
   wherein determining the one or more rules that apply to the first SQL function comprises:
   determining whether an input parameter of the first SQL function is a null value;
   determining whether the first SQL function is a member of a specified set of SQL functions; and
   in response to a determination that (a) an input parameter of the first SQL function is a null value and (b) the first SQL function is a member of the specified set of SQL functions, including, within the one or more rules, a rule which, when applied, replaces the first SQL function with a null value.

2. A method of simplifying an abstract syntax tree that represents a query, comprising:
   determining whether the abstract syntax tree includes a representation of a first Structured Query Language (SQL) function that either (a) has an input parameter that is of Extensible Markup Language (XML) sequence type or (b) has an output parameter that is of XML sequence type; and
   in response to a determination that the abstract syntax tree includes the representation, determining one or more rules that apply to the first SQL function; and
   prior to evaluating the abstract syntax tree to execute the query, modifying the abstract syntax tree by applying the one or more rules to the first SQL function in the abstract syntax tree;
   wherein determining the one or more rules that apply to the first SQL function comprises:
   determining whether an input parameter of the first SQL function is a SQL CASE expression;
   determining whether the first SQL function is a member of a specified set of SQL functions; and
   in response to a determination that (a) an input parameter of the first SQL function is a SQL CASE expression and (b) the first SQL function is a member of the specified set of SQL functions, including, within the one or more rules, a rule which, when applied, replaces the first SQL function with a SQL CASE expression that contains the first SQL function as a return expression.

3. A method of simplifying an abstract syntax tree that represents a query, comprising:
   determining whether the abstract syntax tree includes a representation of a first Structured Query Language (SQL) function that either (a) has an input parameter that is of Extensible Markup Language (XML) sequence type or (b) has an output parameter that is of XML sequence type; and
   in response to a determination that the abstract syntax tree includes the representation, determining one or more rules that apply to the first SQL function; and
   prior to evaluating the abstract syntax tree to execute the query, modifying the abstract syntax tree by applying the one or more rules to the first SQL function in the abstract syntax tree;
   wherein determining the one or more rules that apply to the first SQL function comprises:
   determining whether the first SQL function has (a) a first input parameter that is a first integer, (b) a second input parameter that is a second integer, and (c) an output parameter that is an XML sequence of atomic values that represent all integers between and including the first integer and the second integer;
   determining whether the first integer is equal to the second integer; and
   in response to a determination that (a) the first SQL function has (i) a first input parameter that is a first integer, (ii) a second input parameter that is a second integer, and (iii) an output parameter that is an XML sequence of atomic values that represent all integers between and including the first integer and the second integer, and (b) the first integer is equal to the second integer, including, within the one or more rules, a rule which, when applied, replaces the first SQL function with the first integer.

4. A method of processing a Structured Query Language (SQL) query, comprising:
   processing a query that contains at least one SQL function that has (a) an input parameter that is of Extensible Markup Language (XML) sequence type and (b) produces output that is not of XML sequence type; and
   evaluating the SQL function;
   wherein an input parameter of the SQL function is a first instance that (a) is of XML sequence type and (b) is a sequence of items, wherein the output of the SQL function is a SQL collection of XMLType instances, wherein each XMLType instance in the output SQL collection of instances is of XML content type, and wherein for each particular item in the sequence of items, the output SQL collection contains a separate instance that corresponds to said each particular item.

5. A method of processing a Structured Query Language (SQL) query, comprising:
   processing a query that contains at least one SQL function that (a) does not take any Extensible Markup Language (XML) type as input and (b) produces output that is of XML sequence type; and
   evaluating the SQL function;
   wherein an input parameter of the SQL function is a SQL scalar value, wherein the output of the SQL function is an instance that (a) is of XML sequence type and (b) is a sequence of an XQuery atomic value, and wherein the SQL scalar value is equal to the XQuery atomic value.

6. One or more non-transitory machine-readable media storing instructions for simplifying an abstract syntax tree that represents a query, wherein the instructions, when executed by one or more processors, cause:
   determining whether the abstract syntax tree includes a representation of a first Structured Query Language (SQL) function that either (a) has an input parameter that is of Extensible Markup Language (XML) sequence type or (b) has an output parameter that is of XML sequence type; and in response to a determination that the abstract syntax tree includes the representation, determining one or more rules that apply to the first SQL function; and prior to evaluating the abstract syntax tree to execute the query, modifying the abstract syntax tree by applying the one or more rules to the first SQL function in the abstract syntax tree;

wherein determining the one or more rules that apply to the first SQL function comprises:

determining whether an input parameter of the first SQL function is a null value;

determining whether the first SQL function is a member of a specified set of SQL functions; and in response to a determination that (a) an input parameter of the first SQL function is a null value and (b) the first SQL function is a member of the specified set of SQL functions, including, within the one or more rules, a rule which, when applied, replaces the first SQL function with a null value.

7. One or more non-transitory machine-readable media storing instructions for simplifying an abstract syntax tree that represents a query, wherein the instructions, when executed by one or more processors, cause:

determining whether the abstract syntax tree includes a representation of a first Structured Query Language (SQL) function that either (a) has an input parameter that is of Extensible Markup Language (XML) sequence type or (b) has an output parameter that is of XML sequence type; and in response to a determination that the abstract syntax tree includes the representation, determining one or more rules that apply to the first SQL function; and prior to evaluating the abstract syntax tree to execute the query, modifying the abstract syntax tree by applying the one or more rules to the first SQL function in the abstract syntax tree;

wherein determining the one or more rules that apply to the first SQL function comprises:

determining whether an input parameter of the first SQL function is a SQL CASE expression;

determining whether the first SQL function is a member of a specified set of SQL functions; and in response to a determination that (a) an input parameter of the first SQL function is a SQL CASE expression and (b) the first SQL function is a member of the specified set of SQL functions, including, within the one or more rules, a rule which, when applied, replaces the first SQL function with a SQL CASE expression that contains the first SQL function as a return expression.

8. One or more non-transitory machine-readable media storing instructions for simplifying an abstract syntax tree that represents a query, wherein the instructions, when executed by one or more processors, cause:

determining whether the abstract syntax tree includes a representation of a first Structured Query Language (SQL) function that either (a) has an input parameter that is of Extensible Markup Language (XML) sequence type or (b) has an output parameter that is of XML sequence type; and in response to a determination that the abstract syntax tree includes the representation, determining one or more rules that apply to the first SQL function; and prior to evaluating the abstract syntax tree to execute the query, modifying the abstract syntax tree by applying the one or more rules to the first SQL function in the abstract syntax tree;

wherein determining the one or more rules that apply to the first SQL function comprises:

determining whether the first SQL function has (a) a first input parameter that is a first integer, (b) a second input parameter that is a second integer, and (c) an output parameter that is an XML sequence of atomic values that represent all integers between and including the first integer and the second integer;

determining whether the first integer is equal to the second integer; and in response to a determination that (a) the first SQL function has (i) a first input parameter that is a first integer, (ii) a second input parameter that is a second integer, and (iii) an output parameter that is an XML sequence of atomic values that represent all integers between and including the first integer and the second integer, and (b) the first integer is equal to the second integer, including, within the one or more rules, a rule which, when applied, replaces the first SQL function with the first integer.

9. One or more non-transitory machine-readable media storing instructions for processing a Structured Query Language (SQL) query, wherein the instructions, when executed by one or more processors, cause:

processing a query that contains at least one SQL function that (a) has an input parameter that is of Extensible Markup Language (XML) sequence type and (b) produces output that is not of XML sequence type; and evaluating the SQL function;

wherein an input parameter of the SQL function is a first instance that (a) is of XML sequence type and (b) is a sequence of items, wherein the output of the SQL function is a SQL collection of XMLType instances, wherein each XMLType instance in the output SQL collection of instances is of XML content type, and wherein for each particular item in the sequence of items, the output SQL collection contains a separate instance that corresponds to said each particular item.

10. One or more non-transitory machine-readable media storing instructions for processing a Structured Query Language (SQL) query, wherein the instructions, when executed by one or more processors, cause:

processing a query that contains at least one SQL function that (a) does not take any Extensible Markup Language (XML) type as input and (b) produces output that is of XML sequence type; and evaluating the SQL function;

wherein an input parameter of the SQL function is a SQL scalar value, wherein the output of the SQL function is an instance that (a) is of XML sequence type and (b) is a sequence of an XQuery atomic value, and wherein the SQL scalar value is equal to the XQuery atomic value.

* * * * *

UNITED STATES PATENT AND TRADEMARK OFFICE
CERTIFICATE OF CORRECTION

PATENT NO. : 8,463,801 B2
APPLICATION NO. : 11/098887
DATED : June 11, 2013
INVENTOR(S) : Liu et al.

It is certified that error appears in the above-identified patent and that said Letters Patent is hereby corrected as shown below:

On Title page 2, column 1, under other publications, line 13, delete "Preli Minary" and insert -- Preliminary --, therefor.

On Title page 2, column 1, under other publications, line 22, delete "el" and insert -- et --, therefor.

On Title page 2, column 1, under other publications, line 25, delete "sated" and insert -- dated --, therefor.

On Title page 2, column 1, under other publications, line 13, delete "XQuey" and insert -- XQuery --, therefor.

In the Specification

In column 6, line 39, delete "instancealso" and insert -- instance also --, therefor.

In column 7, line 21, delete "collectionof" and insert -- collection of --, therefor.

In column 8, line 32, delete "Represent" and insert -- Represents --, therefor.

In column 10, line 53, delete "(CONTENTpi()" and insert -- (CONTENT(pi() --, therefor.

In column 11, line 4, delete "(comrent()?))." and insert -- -(comment()?)). --, therefor.

In column 11, line 12, delete "If"x"" and insert -- If "x" --, therefor.

In column 12, line 43, delete "if"c"" and insert -- if "c" --, therefor.

Signed and Sealed this
Eighth Day of October, 2013

Teresa Stanek Rea
*Deputy Director of the United States Patent and Trademark Office*